3,248,239
PROCESS OF MAKING MAGNESIA CHROME REFRACTORY BRICK OF INCREASED STRENGTH AT ELEVATED TEMPERATURES
Russell Pearce Heuer, Villanova, Pa., assignor to General Refractories Company, a corporation of Pennsylvania
No Drawing. Filed Apr. 19, 1963, Ser. No. 274,327
12 Claims. (Cl. 106—59)

The present invention relates to a method of producing magnesia-chrome refractory brick containing calcined magnesia and chrome ore and to refractory brick so produced.

A purpose of the invention is to use a lower grade magnesia, herein called Type A, containing less than 90 percent of magensia and more than 4 percent and preferably more than 5 percent of lime as a component of a brick mixture, and to obtain increased strength at elevated temperature in the resultant brick by causing the lower grade magnesia to react with a magnesia known as Type B and/or with a chrome ore which can contribute substantial amounts of silica which will improve the properties of the Type A magnesia.

A further purpose is to employ as the lower grade or Type A magnesia a calcined magnesite containing the following composition by weight:

MgO _____ More than 78 to less than 90% and preferably 80 to 88%.
CaO _____ 4 to 20% and preferably 5 to 10%.
$Fe_2O_3$ _____ 4 to 12% and preferably 4 to 10%.
$SiO_2$ _____ 0.05 to 2%.

An exception is made when the MgO content is less than 80% in which case the content of silica is in the range between 0.05 and 3%. This magnesia contains dicalcium ferrite in a quantity between 7 and 20% and preferably between 7 and 13%.

A further purpose is to mix a Type A or low grade magnesia containing from 7 to 20% of dicalcium ferrite with from 5 to 50% on the dry weight of the mix of a chrome ore having the following composition by weight:

|  | Percent |
|---|---|
| $Cr_2O_3$ | 30 to 50 |
| $SiO_2$ | 2 to 7 |

A further purpose is to mix a Type A or low grade magnesia containing from 7 to 20% of dicalcium ferrite with a Type B magnesia which contains more silica than lime and which suitably has a composition as follows:

|  | Percent |
|---|---|
| MgO | 80 to 95 |
| Silica | 3 to 15 |
| Lime | 0.5 to 3 |

Type B magnesia containing 7 to 25% by weight of at least one compound of the class consisting of forsterite and monticellite; and also with from 5 to 50% on the dry weight of the mix of a chrome ore having the following composition by weight:

|  | Percent |
|---|---|
| $Cr_2O_3$ | 30 to 50 |
| $SiO_2$ | 2 to 7 |

A further purpose is to produce a low cost basic refractory brick which is suitable for use without kiln firing and which has improved strength at intermediate temperature and high temperature.

A further purpose is to prepare a refractory brick suitable for use without kiln firing at elevated temperatures by combining with any of the above mixtures from 1 to 10% of iron powder so as to improve the strength and refractoriness.

In my U.S. Patent No. 3,108,007, issued October 22, 1963, I disclose a mixture of a magnesia containing at least 90% of MgO and 2½ to 3½% by weight of lime with Transvaal chrome ore containing silica. The mixture has a lime silica ratio of about 1.5 and at furnace temperature reacts to reduce the quantity or eliminate dicalcium ferrite and improve the high temperature strength of the refractory brick.

In accordance with the present invention, I am seeking to obtain comparable high temperature strength by improving the high temperature properties of brick made from lower grade magnesia. In the present invention I desirably employ as an important or principal ingredient a calcined magnesia known as Type A which is capable of forming when calcined to approximately equilibrium conditions a mineral phase of dicalcium ferrite in excess of 7% by weight of magnesia and suitably between 7 and 20%, preferably between 7 and 13%. The Type A magnesia should contain a relatively large amount of lime, that is between 4 and 20% and preferably between 5 and 10%. It also contains iron oxide calculated as $Fe_2O_3$ between 4 and 12% and preferably between 5 and 10%. It also preferably contains a content of alumina plus manganese oxide (MnO) of about 1% by weight. The magnesia content of the Type A magnesia is in the range above 78 and below 90% and normally will be in the range between 80 and 88% by weight. Notwithstanding that the Type A magnesia is low grade, it contains low silica, which is in the range of 0.05% to 2%, except that where the magnesia content is less than 80% by weight the silica content is in the range between 0.05% and 3% by weight.

The chrome ore to be admixed is preferably of the Transvaal or Philippine type having the following typical analysis:

|  | Transvaal Chrome Ore, percent | Philippine Chrome Ore, percent |
|---|---|---|
| $SiO_2$ | 3.64 | 5.4 |
| FeO | 26.26 | 13.0 |
| $Al_2O_3$ | 17.39 | 30.3 |
| CaO | 0.23 | 0.5 |
| MgO (diff.) | 10.35 | 17.1 |
| $Cr_2O_3$ | 41.13 | 32.7 |

Other refractory chrome ores such as those from Turkey, Iran, or Cuba may also be used.

These ores all contain silica as an impurity usually present as fusible silicates of magnesia. The resultant mixture of chrome ore and magnesia may contain between 5 and 50% of chrome ore, but the ingredients should be chosen so that the ratio of lime to silica in the mixtures exceeds 1.3 and is preferably less than 3.5. If the mixture contains a molar lime-silica ratio of 2 when it is heated to above 1100° C., the dicalcium ferrite in the Type A magnesia is converted into dicalcium silicate, thus bonding the refractory and eliminating the fusible dicalcium ferrite and the fusible silicate impurities of the chrome ore thereby improving the high temperature properties. If the lime silica ratio is 1.5 merwinite will be formed and if the ratio is 3 or more tricalcium silicate will be present. All of these reaction products are more refractory than the initial components present before making the mixture.

Type B magnesia to be admixed is chosen so that it has a lime-silica ratio which is less than one in the preferred embodiment and therefore contains monticellite and/or forsterite. The composition of Type B magnesia is suitably as follows:

MgO _____ 80 to 95%, and most desirably 85 to 95%.
Iron oxide (Fe₂O₃) ___ 0.5% to 2%, and preferably 0.5 to 1%.
Lime _____ 0.5 to 3%.
Silica _____ 3% to 15% or more, preferably 3 to 10%.

Type B magnesia contains between 7 and 25% of at least one of the compounds monticellite (mono-calcium magnesium silicate) and forsterite (dimagnesium silicate).

Typical analyses of Type A and Type B magnesias are the following:

|  | Type A Magnesia, percent | Type B Magnesia, percent |
| --- | --- | --- |
| SiO₂ | 0.70 | 3.57 |
| Fe₂O₃ | 5.13 | 0.11 |
| Al₂O₃ | 0.42 | 0.12 |
| CaO | 7.22 | 2.35 |
| MgO (diff.) | 86.53 | 93.85 |

For best results, Type A magnesia or a mixture of Type A plus Type B magnesias in proportions of from 10 to 75% by weight of each is mixed with from 5 to 50% preferably 5 to 35% by weight of chrome ore so that the lime-silica ratio in the final mixture is in the range between 1.3 and 3.5 or more and preferably about 2. Small amounts of fire clay up to 4% may also be included in the mix.

If the mixture has a molar ratio of lime to silica which is 2, dicalcium silicate will form from monticellite and forsterite present in the Type B magnesia as follows:

$$C_2F + M_2S \rightarrow C_2S + MF + M$$
$$C_2F + 2CMS \rightarrow 2C_2S + MF + M$$

In the foregoing reactions, $C_2F$ designates dicalcium ferrite, $M_2S$ is dimagnesium silicate or forsterite, $C_2S$ is dicalcium silicate, $MF$ is magnesium ferrite, $M$ is magnesia, and $CMS$ is monocalcium magnesium silicate or monticellite.

It will be evident that the magnesias are upgraded when subjected to furnace temperature because dicalcium ferrite is eliminated from one magnesia and monticellite is eliminated from the other, both of which are unsatisfactory because they have poor refractory property. Dicalcium silicate on the other hand is refractory, and of course free magnesia is very refractory and magnesium ferrite is refractory.

The free magnesia and magnesium ferrite cooperate to form a refractory bond. The reaction of the dicalcium ferrite to eliminate it begins at relatively low temperatures so that by the time a temperature of 1100° C. is achieved, a ceramic bond is produced which is very beneficial in increasing the physical properties of the refractory at intermediate and at high temperatures.

In carrying out the process of the invention, it is desirable to crush and grind the Type A and Type B magnesia and the chrome ore and screen them to select coarse particles which pass through a 4 mesh per linear inch screen and rest on an 8 mesh per linear inch screen, also coarse particles which pass through an 8 mesh per linear inch screen and rest on a 28 mesh per linear inch screen, and also fine particles which pass through a screen having 48 mesh per linear inch or finer.

*Example I*

Type A magnesia and Philippine chrome ore are crushed, ground and screened as described above.

The particles are mixed together as follows:

| | Parts |
| --- | --- |
| Type A magnesia, 4 x 8 mesh | 20 |
| Type A magnesia, 8 x 28 mesh | 35 |
| Type A magnesia, thru 48 mesh | 25 |
| Philippine chrome ore, thru 48 mesh | 20 |
| Bond clay, thru 48 mesh | 2 |

To the mixture is added dilute sulfuric acid (22° Bé.) in a suitable quantity to moisten the brick, the amount of moisture by way of example being 3% on the weight of the brick. The brick is then pressed into a refractory brick shape under a pressure which exceeds 5000 p.s.i. and in the preferred procedure exceeds 15000 p.s.i. The molded bricks are then in the particular example treated with carbon dioxide gas under a pressure of about 15 p.s.i. gauge, in accordance with my U.S. Patent No. 2,656,279.

The bricks, after the carbon dioxide treatment is over, are then dried, the particular technique used being to dry at 150° C. to constant weight. The refractory bricks are now ready for use in a metallurgical furnace without kiln firing. They have excellent high temperature properties, and improved strength at elevated temperatures. They are useful in lining rotary cement kilns, and metallurgical furnaces such as copper smelting furnaces, copper refining furnaces, suspended ends and downstakes of open hearth steel making furnaces, and checker brick in the regenerator systems of open hearth steel making furnaces.

If prefiring is considered necessary, they can be fired in refractory brick kilns, and they are characterized by high strength at intermediate temperatures. The invention facilitates burning with low loss since the brick attain suitable strength at lower temperatures than usual (for example in the range between 1400 and 1500° C.) and this protects against warpage and cracking as the burning temperature increases.

Without limiting myself to any theory, it will be noted that it is well known that basic refractory bricks used without kiln firing are subject to loss in strength when subjected to intermediate temperatures of the order of 2300° F. (1260° C.). The composition of the present invention on the other hand actually shows improved strength at intermediate temperatures and I believe that this is due to the reactions described above which form bonding substances such as dicalcium silicate and magnesium ferrite.

*Example II*

Type A magnesia and Transvaal chrome ore are screened as in Example I, and the following mix is prepared:

| | Parts |
| --- | --- |
| Type A magnesia, 4 x 8 mesh | 11.7 |
| Type A magnesia, 8 x 28 mesh | 23.3 |
| Type A magnesia, thru 48 mesh | 16.9 |
| Transvaal chrome ore, 4 x 8 mesh | 11.0 |
| Transvaal chrome ore, 8 x 28 mesh | 9.0 |
| Transvaal chrome ore, thru 48 mesh | 28.1 |

This mixture is moistened, pressed into brick form and treated as in Example I.

*Example III*

Type A and Type B magnesia are crushed, ground and screened as described above, and the following mix is prepared:

| | Parts |
| --- | --- |
| Type A magnesia: | |
| 4 x 8 mesh | 14.0 |
| 8 x 28 mesh | 26.0 |
| Passing 48 mesh | 12.0 |
| Type B magnesia, passing 48 mesh | 23.0 |
| Chrome ore: | |
| 4 x 8 mesh | 12.5 |
| 8 x 28 mesh | 12.5 |

This mixture is moistened and pressed into brick form and treated as in Example I.

*Example IV*

The improved bond can further be increased in strength by adding to the refractory brick small quantities of iron powder, suitably 1 to 10% and preferably 2 to 5% by weight of the dry brick. This permits the formation of additional magnesium ferrite by reaction with magnesia formed from the reaction between dicalcium ferrite and silica present in the Type B magnesia and in the chrome ore. The magnesium ferrite thus further improves the strength at intermediate and high temperatures.

In the process of Example III, I incorporated 2% on the dry weight of the brick of iron powder through 100 mesh per linear inch.

The procedure as described in Example III was carried out with this change and the resulting brick had the following unusual properties:

| | |
|---|---|
| Bulk density | 3.10 |
| Modulus of rupture after drying, p.s.i. | 2030 |
| Modulus of rupture tested at 1260° C., p.s.i. | 1910 |
| Temperature of failure under 25 p.s.i. static load, ° C. | 1687 |
| Linear change upon heating to 1650° C., percent shrinkage | 0.78 |

Since the determination of the amount of calcium ferrite present may create a problem, I will define the determination of calcium ferrite. First calculate the amount of lime required to unite with the silica present to form $C_2S$, and subtract this from the total lime present to give the amount of excess lime. Assume this excess lime to combine with iron oxide to form $C_2F$. Any small amount of alumina present will form tetra calcium aluminum ferrite $C_4AF$, and I consider this as included in the calculated amount of $C_2F$ present.

When I refer herein to percentage, I mean percentage by weight except in the case of linear change upon heating at 1650° C. which is percentage in a linear dimension.

When I refer to mesh herein, I intend to designate Tyler Standard mesh per linear inch.

In view of my invention and disclosure, variations and modifications to meet individual whim or particular need will doubtless become evident to others skilled in the art, to obtain all or part of the benefits of my invention without copying the process and composition shown, and I therefore claim all such insofar as they fall within the reasonable spirit and scope of my invention.

Having thus described my invention, what I claim as new and desire to secure by Letters Patent is:

1. A process of producing magnesia refractory brick of increased strength at elevated temperatures based on calcined magnesia, which comprises mixing together with a bonding substance:
    (a) from 50% to 95% by weight of a magnesia having the following composition by weight:
        MgO from 80% to 90%,
        Dicalcium ferrite as a mineralogical component 7% to 20%,
        Ferric oxide from 4% to 12%,
        Silica from .05% to 2%, and
        Lime from 4% to 20%, with
    (b) from 5% to 50% by weight of a chrome ore having the following composition by weight:
        Chromium oxide from 30% to 50%,
        Silica from 2% to 7%;
the ratio of lime to silica by weight in the mixture being in the range between 1.3 and 3.5, said components making up essentially the entire mixture, molding the mixture into a refractory brick, whereby when the refractory brick is subjected to furnace temperature the chrome ore reacts with the magnesia to convert the dicalcium ferrite to at least one compound of the class consisting of tricalcium silicate, dicalcium silicate, merwinite and magnesium ferrite.

2. A process of claim 1, which comprises incorporating in the mix from 1 to 10% by weight of iron powder.

3. A process of claim 1, which comprises incorporating into the mix from 2 to 5% by weight of iron powder.

4. A process of producing magnesia refractory brick of increased strength at elevated temperatures which comprises mixing together with a bonding substance:
    (a) from 50% to 95% by weight of a mixture of magnesias, said mixture consisting of 10% to 75% by weight of each of two types of magnesias, a first of said types of magnesia having the following composition by weight:
        MgO from 80% to 90%,
        Dicalcium ferrite as a mineralogical component 7% to 20%,
        Ferric oxide from 4% to 12%,
        Silica from .05% to 2%, and
        Lime from 4% to 20%,
    the second type of said magnesia having the following composition by weight:
        MgO from 80% to 90%,
        Silica from 3% to 15%,
        Lime from .5% to 3%,
        Ferric oxide from .5% to 2%, and
        7% to 25% of at least one member of the group consisting of mono-calcium magnesium silicate and dimagnesium silicate, with
    (b) from 5% to 50% by weight of a chorme ore having the following composition by weight:
        Chromium oxide from 30% to 50%, and
        Silica from 2% to 7%;
the ratio of lime to silica by weight in the mix being in the range of from 1.3 to 3.5, said chrome ore and magnesia components making up essentially the entire mixture, and molding the mixture into a refractory brick, whereby when the refractory brick is subjected to furnace temperature the chrome ore and the second magnesia react with the first magnesia to convert the dicalcium ferrite present therein to at least one compound of the class consisting of tricalcium silicate, dicalcium silicate, merwinite, and magnesium ferrite.

5. A process of claim 4, which comprises incorporating in the mix from 1 to 10% by weight of iron powder.

6. A process of claim 4, which comprises incorporating into the mix from 2 to 5% by weight of iron powder.

7. A magnesia-chrome refractory brick of increased strength at elevated temperatures consisting essentially of:
    (a) from 50% to 95% by weight of a magnesia having the following composition by weight:
        MgO from 80% to 90%,
        Dicalcium ferrite as a mineralogical component 7% to 20%,
        Ferric oxide from 4% to 12%,
        Silica from .05 to 2%, and
        Lime from 4% to 20%, with
    (b) from 5% to 50% by weight of a chrome ore having the following composition by weight:
        Chromium oxide from 30% to 50%,
        Silica from 2% to 7%;
the refractory brick having a ratio of lime to silica by weight between 1.3 and 3.5, whereby the chrome ore on heating to furnace temperature reacts with the dicalcium ferrite present in the magnesia to produce at least one compound of the class consisting of tricalcium silicate, dicalcium silicate, merwinite and magnesium ferrite.

8. A refractory brick of claim 7, which also essentially contains from 1 to 10% by weight of iron powder.

9. A refractory brick of claim 7, which also essentially contains from 2 to 5% of iron powder.

10. A magnesia-chrome refractory brick of increased strength at elevated temperatures consisting essentially of:
(a) from 50% to 95% by weight of a mixture of magnesias, said mixture consisting of 10% to 75% by weight of each of two types of magnesias, a first magnesia having the following composition by weight:
MgO from 80% to 90%,
Dicalcium ferriate as a mineralogical component 7% to 20%,
Ferric oxide from 4% to 12%,
Silica from .05% to 2%, and
Lime from 4% to 20%,
the second type of said magnesia having the following composition by weight:
MgO from 80% to 90%,
Silica from 3% to 15%,
Lime from .5% to 3%,
Ferric oxide from .5% to 2%, and
7% to 25% of at least one member of the group consisting of mono-calcium magnesium silicate and dimagnesium silicate, with
(b) from 5% to 50% by weight of a chrome ore having the following composition by weight:
Chromium oxide from 30% to 50% and
Silica from 2% to 7%;

the refractory brick having a ration of lime to silica by weight between 1.3 to 3.5, whereby the chrome ore and the second magnesia, upon heating to furnace temperature, convert the dicalcium ferrite present in the first magnesia to at least one member of the group consisting of tricalcium silicate, dicalcium silicate, merwinite and magnesium ferrite.

11. A refractory brick of claim 10, which also essentially contains from 1 to 10% by weight of iron powder.

12. A refractory brick of claim 10, which also essentially contains from 2 to 5% of iron powder.

References Cited by the Examiner
UNITED STATES PATENTS

| | | | |
|---|---|---|---|
| 2,443,424 | 6/1948 | Heuer | 106—59 |
| 2,639,993 | 5/1953 | Heuer | 106—60 |
| 2,656,279 | 10/1953 | Heuer | 106—59 |
| 2,656,280 | 10/1953 | Heuer | 106—59 |
| 3,036,925 | 5/1962 | Heuer | 106—59 |
| 3,042,534 | 7/1962 | Heuer | 106—59 |

TOBIAS E. LEVOW, *Primary Examiner.*